Figure 1:
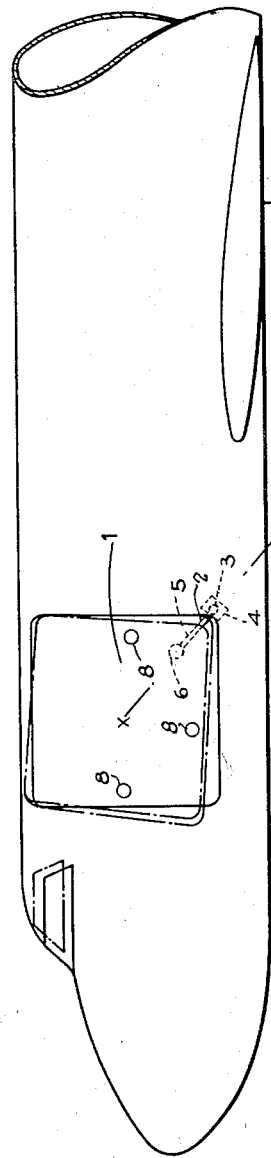

Dec. 10, 1963 R. TUCKNOTT 3,113,353
MECHANISM FOR FACILITATING THE CLOSING OF
DOORS AND SIMILAR CLOSURES
Filed Aug. 29, 1960 3 Sheets-Sheet 1

ROBERT TUCKNOTT
INVENTOR.

by Richardson, David and Nordon
ATTORNEYS.

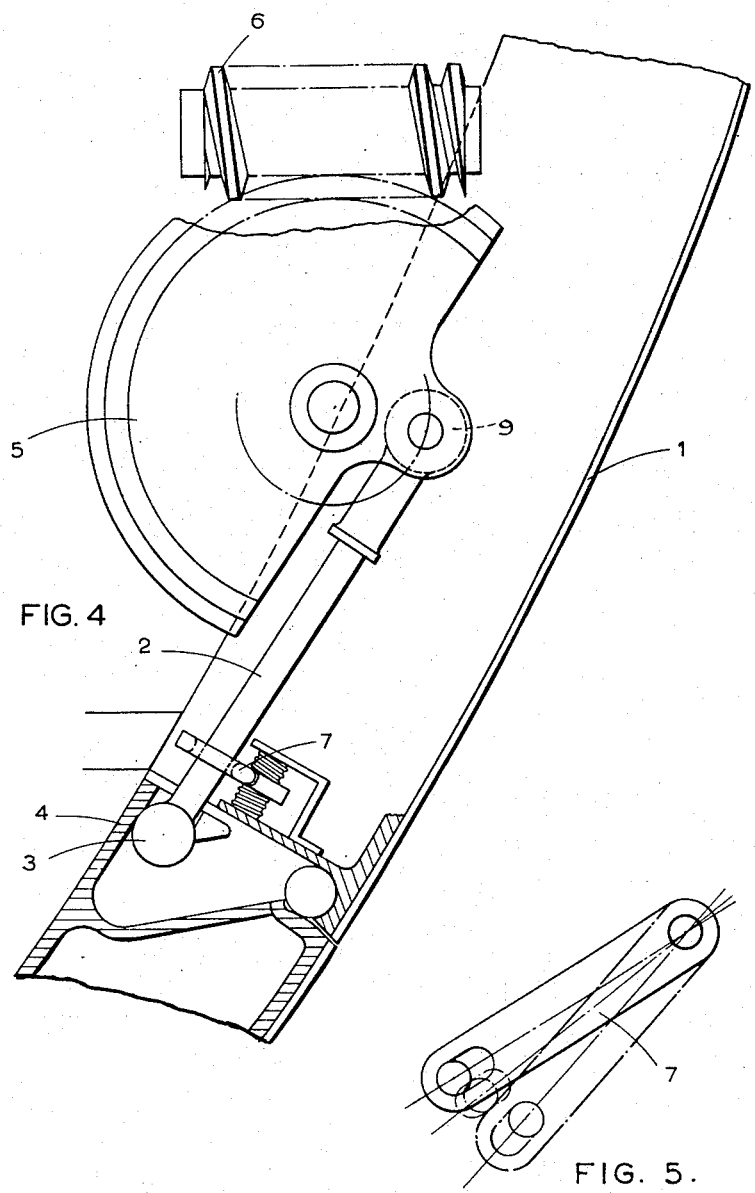

United States Patent Office 3,113,353
Patented Dec. 10, 1963

3,113,353
MECHANISM FOR FACILITATING THE CLOSING OF DOORS AND SIMILAR CLOSURES
Robert Tucknott, Hull, England, assignor to Blackburn Aircraft Limited, Brough, England, a British company
Filed Aug. 29, 1960, Ser. No. 52,418
Claims priority, application Great Britain Sept. 17, 1959
3 Claims. (Cl. 20—16)

This invention relates to mechanism for facilitating the closing of hinged doors and similar closure members in apertures or door-openings which are liable to or become distorted when the door is open due to stresses imposed on the structure having such door opening.

When a thin wall structure, such as an aircraft fuselage, is supported or carried at a plurality of points, for example by the nose and main landing wheels while the aircraft is standing on the ground, it is subjected to stresses not the least of which is its weight so that any substantial interruption in its structure will cause it to distort. For this reason it is customary to make the door opening small and the surrounding structure strong enough to reduce distortion to a permissible minimum and employ non-structural-load carrying doors even though it would be possible to reduce the weight of the structure, i.e. the aircraft, if the door was made to carry structural loads while closed.

The problem is more serious when it is required to provide large doors, particularly for freight, and hitherto there has been a general avoidance of large doors in the sides of aircraft fuselages.

Now the object of the present invention is to provide means for facilitating the closing of a door or like hinged closure member, when such door is large and comprises a substantial portion of the cross-section of the structure and is designed when closed to carry part of the structure load, in an opening in a structure which will distort when such door is open.

The invention is mainly applicable to circular section and elliptical shape section thin-shell structures, such as aircraft fuselages, in which as a result of opening a large structural-load carrying door the structure distorts due to external forces acting thereon so that the opening becomes misshapen, and serves to restore the door opening to shape by reacting against the distortion of the structure so that the door can be closed with a minimum of clearance and thereby its sealing, in the case of pressurized structure, made the easier.

To the above end according to the present invention, a movable member mounted on the door remote from its hinge engages co-operating means adjacent the point of maximum distortion of the opening and is then moved so that its effort on the co-operating means acting through the door to the structure pulls the opening back to shape for the door to close therein. Thus there is provided, at the position of substantially maximum distortion of the door opening relative to the door and remote from its hinge-line, a socket engageable by a ball—or similar enlarged—end member which is mounted on the door and is movable to draw together the edge of the opening and the edge of the door so restoring the opening to shape and closing the door therein.

The arrangement is such that with the door partly closed, i.e. closed as far as possible, the enlarged-end member (hereinafter called a ball-end member) may be moved to engage the socket and thereafter further moved substantially axially so that by the tension of such member acting through the stiffness of the door it will pull the opening back to shape with entry of the door therein. After complete closing of the door it is locked closed, for example by means of a plurality of the locks described in the specification of our co-pending patent application Serial No. 52,507 filed Aug. 29, 1960, and now abandoned (corresponding to British patent application No. 31,778/59) and the ball-end member is then reverse moved to disengage the socket so that it will not impede the free opening of the door and at the same time condition it for further use in the next closing of the door.

The ball-end member may be moved by different mechanism. Thus for hand operation it may be moved by engagement with a toothed quadrant which is turned to effect the necessary displacement of the ball-end member by a manually rotatable worm meshing with the teeth thereof. For foot operation, the ball-end member may be temporarily connected to a pedal operated mechanism, which could be mounted inside the structure. The ball-end member may also be displaced by power as by means of a hydraulic jack or electrical linear actuator or by an electric motor rotating the drive to the toothed quadrant or the equivalent.

In order that the invention may be clearly understood, it is hereinafter more fully described with reference by way of example to an embodiment thereof with a door mounted ball-end member suitable for hand operation illustrated in the accompanying drawings and given for purposes of illustration only and not of limitation, and in which:

FIG. 1 is a side elevation of part of an aircraft fuselage with a large door in the side thereof and showing in broken lines the distorted shape of the door opening when the door is open.

Figure 2:
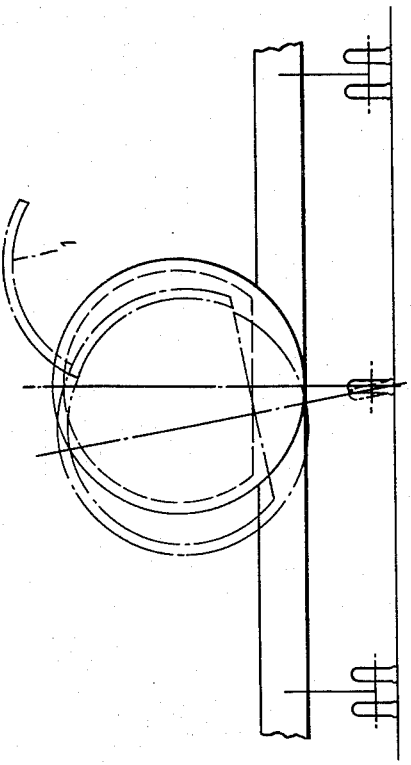
Figure 3:
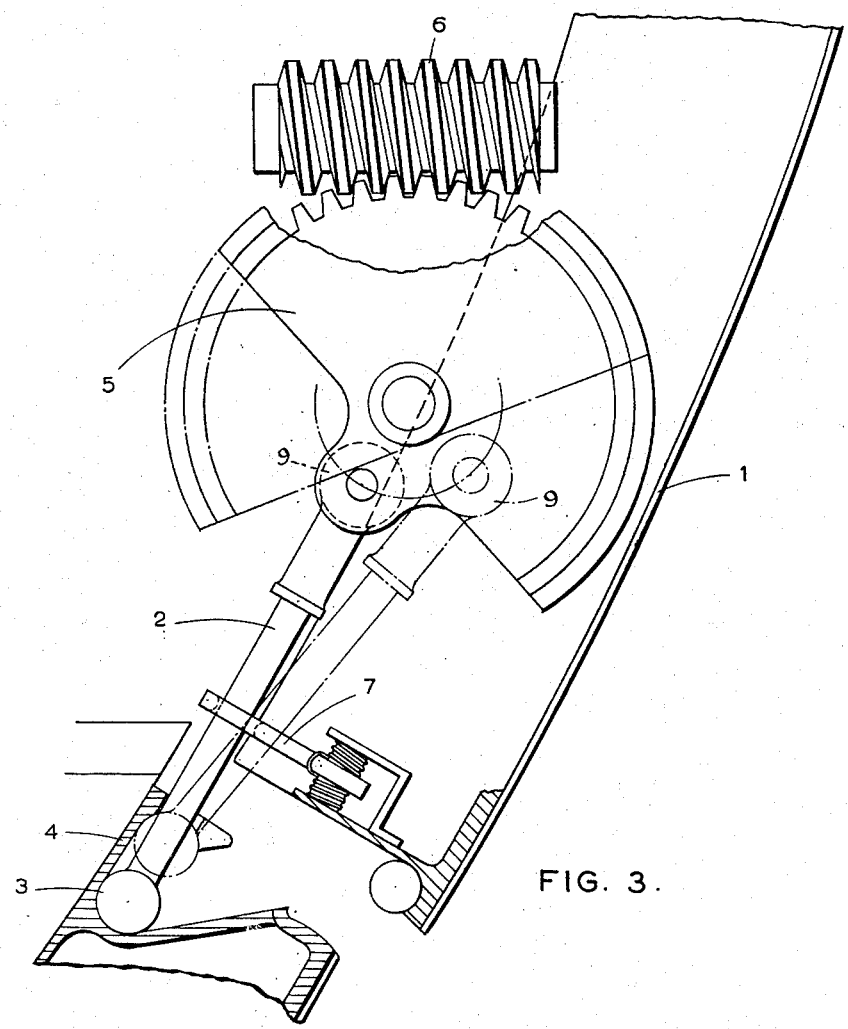

FIG. 2 is a front elevation of such aircraft fuselage showing its normal position with the door closed and its distorted position with the door open, and the ajar position of the door with the fuselage distorted, FIG. 3 is a section through an edge of the door and of the edge of the door opening with the ball-end member shown in two positions, i.e. "normal" and "engaged" prior to a door closing, FIG. 4 is a view similar to FIGURE 3 with the ball-end member fully displaced to complete the closing of the door, and FIG. 5 is a plan view of the retaining lever which guides the ball-end member.

In the said drawings, FIGS. 1 and 2 are given in exaggerated representation for the purpose of explaining the distortion of a thin-wall structure, namely an aircraft fuselage when supported at spaced points namely three points by the nose wheel and main landing wheels respectively in the case of the embodiment illustrated, and when there is a substantial interruption in the cross-section of such structural-load carrying door. Thus the full-line circle in FIG. 2 representing the fuselage in normal position with the door 1 closed is displaced on opening the door 1 due to distortion to the broken-line position shown. Then on moving the door 1 towards closed position there is a substantial gap at the bottom, indicated by the door ajar position, as well at the sides as can be appreciated from an examination of FIG. 1 which shows the distorted door opening relative to the door.

To enable the door 1 to be closed back into the door opening structure, load must be taken through the door to counteract the distortion by pulling back the structure into normal position. This is achieved according to the present invention by providing, substantially at the point of maximum distortion of the door opening relative to door 1 and remote from the hinge line of the door, means for pulling the fuselage and opening into correct shape by using the diagonal strength of the door as a tension member to impose an opposite moment to the fuselage which compensates for the imposed moment of the ground reaction causing the distortion. Such means are positioned to act along the line $x$—$x$ shown in FIG. 1.

In the mechanism illustrated in FIGS. 3 to 5, the door 1 is provided with a member or rod 2 having a ball-shaped end 3 projecting through the edge of such door, while in the edge of the door opening there is provided a recess leading to a flared mouth socket 4.

With the door ajar, the rod 2 is extended so that its ball-end 3 will enter the recess at the opening edge and thereafter on the rod 2 being moved substantially axially its end 3 will enter the socket 4. Further movement of the rod 2 draws together the edges of the door and opening with pulling of the structure and opening back into normal shape.

With the door 1 fully closed and locked so that structural loads are transmitted through the door, the rod 2 is reverse moved back into its normal projecting position clear of the socket 4 so that it may freely ride out of the recess on opening the door.

The rod 2 is moved in the particular embodiment illustrated by being connected to a toothed quadrant 5 with the teeth of which mesh a worm 6 capable of being manually rotated as by means of a crank handle. Rotation of the worm 6 rotates the quadrant 5 anti-clockwise and so moves the rod 2 from its normal position shown in full-lines to the broken line position in which the ball-end 3 engages in the socket 4. Continued rotation then causes the rod 2 to draw together the edge of the opening and the door until the latter is finally closed home as shown in FIG. 4, whereafter after locking the door by separate lock means 8 (FIG. 1), the quadrant is reversed back into its original position and the ball-end 3 of the rod 2 restored to its full projecting position in which the door is free to open.

The rod 2 is connected to the quadrant conveniently through a universal or ball joint 9 and the rod 2 is guided, to enter the socket 4 on its displacement, by a spring loaded retaining lever 7 through which the rod 2 extends (FIG. 5).

Other means may be employed for moving the ball-end rod 2. For example it may be displaced by a hydraulic jack or electric linear actuator or by its temporary connection to a pedal operated mechanism. Also the quadrant 5 in the embodiment illustrated could be power driven as by an electric motor rotating the worm 6. It alone being necessary that the rod 2 is so connected to the door as to transmit to the door the load imposed on pulling the opening to shape to pass that load using the diagonal strength of the door through to the structure. When closed and locked the door carries through it hoop and other structural loads.

I claim:

1. A mechanism to facilitate closing of a door to a warped structure comprising in combination: a structure having an aperture for receiving and engaging a door periphery to impose a structural load thereon, said structure being subject to warping to distort said aperture when the door is open, a large door, hinge means connecting a peripheral portion of the door to said structure at said aperture for swingably opening and closing the door, movable means mounted on said door at a point remote from said peripheral portion, socket means mounted on said structure adjacent to a portion thereof where distortion of the aperture is maximum and remote from said peripheral portion of the door, said socket means being shaped and disposed to engage said movable means when the door is partially closed, drive means for moving said movable means in one direction a distance greater than the maximum distortion of said structure at said aperture and for then moving said movable means in an opposite direction to engage and apply a force on said socket means in said opposite direction, said opposite direction being the direction of the largest dimension of the door, whereby said movable means and said socket means cooperate to restore the structure to unwarped shape without warping the door and thereby restore the distorted aperture to undistorted shape conforming to the periphery of the door while drawing the door closed, and means for locking the door independent of said movable means and said socket means so that said movable means and socket means are disengageable from each other while the door is locked to permit the door to assume a structural load and to open freely when the locking means is released.

2. A mechanism according to claim 1, wherein said movable means comprises a rod having an enlargement at one end, and said structure has a recess near said aperture, said socket means being disposed in said recess and located so that said enlargement engages said socket means only while said rod is being moved outwardly of said recess by said drive means.

3. A mechanism according to claim 2, wherein said drive means includes a universal mounting for said rod, and a spring loaded lever bearing on said rod to urge the rod against said socket means as the rod is moved outwardly of the recess by said drive means.

References Cited in the file of this patent

UNITED STATES PATENTS

| | | |
|---|---|---|
| 2,714,032 | Summers | July 26, 1955 |
| 2,748,855 | Siems et al. | June 5, 1956 |
| 2,764,443 | Bennett | Sept. 25, 1956 |
| 2,904,141 | Henricks | Sept. 15, 1959 |